United States Patent [19]

Sutton et al.

[11] Patent Number: 5,024,689
[45] Date of Patent: Jun. 18, 1991

[54] NITROGEN FERTILIZER

[75] Inventors: Allen R. Sutton, Corydon, Ky.; Richard L. Balser, Tulsa, Okla.

[73] Assignee: Freeport McMoRan Resource Partners, New Orleans, La.

[21] Appl. No.: 153,594

[22] Filed: Feb. 8, 1988

[51] Int. Cl.$^5$ ............................ C05C 9/00; C05G 3/00
[52] U.S. Cl. ........................................ 71/29; 71/30; 71/64.08; 71/64.09; 71/902
[58] Field of Search ......................... 71/1, 11, 27–30, 71/64.08, 64.09, 902

[56] References Cited

U.S. PATENT DOCUMENTS

| | | | |
|---|---|---|---|
| 4,210,437 | 7/1980 | Windgassen et al. | 71/28 |
| 4,234,332 | 11/1980 | Michaud et al. | 71/902 X |
| 4,582,524 | 4/1986 | Lobitz | 71/27 |

FOREIGN PATENT DOCUMENTS 076795 12/1981 United Kingdom .

OTHER PUBLICATIONS

CA(108)25: 220840n, Fairlie, "Effect of . . . Soils" 1987.
CA108(5):36742F, Efimov et al., "Effect of Encapsulation . . . Soils", 1987.
"Relative Phytotoxicity of Decyandiamide . . ." D. W. Reeves and J. T. Touchton, Soil Sci. Soc. Am. V. 50:1353–1357.
"Combining Nitrification Inhibitor Technologies", Goos and Johnson, Proceedings of the 19th North Central Extension-Industry Soil Fertility Conference, 1989.
United States Statutory Invention Registration, No. H25, published Feb. 4, 1986; Thiophosphoryl Triamide as a Urease Inhibitor, Robert Radel.
U.S. 4,500,335 from the Official Gazette dated Feb. 19, 1985; Composition of Matter and Method of Use for Nitrogen Fertilization, Lloyd B. Fenn.
Abstract of U.S. Patent 4,500,336; Process for Making Granules Containing Urea as the Main Component. Filed Jun. 18, 1982, SN: 390,044, Hijfte.
American Chemical Society presentation given at the 1985 annual meeting on Laboratory and Field Evaluation of Ammonium Thiosulfate as a Nitrification and Urease Inhibitor, Informal report.
National Water Summary 1984–Water Quality Issues, p. 93; Overview of the Occurrence of Nitrate in Ground Water of the United States, by Jilann O. Brunett, by Robert Madison.
Agronomic and Environmental Effects of Nitrification Inhibitor Use; by G. L. Malzer, Soil Science Department, University of Minnesota.
A study of Anticaking Treatments for Urea, by G. M. Boluin and A. W. Allen American Chemical Society presentation at annual meeting held Sep. 9–12, 1985.
Abstract of the Dec. 1985 issue of Agronomic Abstracts, Effect of Phosphoroamite as Urease Inhibitors in Field Trails with Corn.
Abstract of the Dec. 1985 issue of Agronomic Abstracts, Use of Dicyandiamide as a Nitrification Inhibitor in Direct Seeded Rice Cultures.
Roland D. Hauck, Agricultural Research Branch, National Fertilizer Dev. Ctr. Nitrification, Its Inhibition & Immobilization/Mineralization Processes in Soils.
Nickel: An Essential Micronutrient for Legumes and Possibly all Higher Plants Science, vol. 222, p. 622.
Identification of Ammonium Thiosulfate as a Nitrification and Urease Inhibitor; Soil Science Society of America Journal, vol. 49, No. 1, Jan.–Feb. 1985, R. J. Goos.
Solubilities and Stabilities of the Nitrogen Loss Inhibitors Dicyandiamide, Thiourea, and Phenyl Phosphorodiamidate in Fluid Fertilizers, J. Gautney, Y. Kim, & A. Barnard, National Fertilizer Dev. Ctr. Jul. 13, 1984.
The Agrico Super N Story (brochure) by Agrico, a division of Freeport-McMoRan Resource Partners.
The Nitrogen with a Better N Result (phamphlet), Agrico, Division of Freeport-McMoRan Resources Partners.
Super N Goes to Market (article) Feature p. 12.

*Primary Examiner*—Ferris H. Lander
*Attorney, Agent, or Firm*—Fisher, Christen & Sabol

[57] ABSTRACT

An improved aqueous nitrogen fertilizer has been developed that increases first-year nitrogen uptake efficiency to plants. It is also a nitrogen with features to minimize exposure to nitrogen loss. It is a nitrogen fertilizer consisting of urea, ammonium nitrate, dicyandiamide, ammonium thiosulfate, and a phosphate compound which is preferably an ammonium phosphate compound. This composition can contain a herbicide and/or various micro nutrients. This aqueous fertilizer solution can be applied to a field crop in a single application and is available to the growing plant throughout its growth and maturing cycle. The aqueous fertilizer composition is conveniently prepared by the addition of a slurry containing dicyandiamide, ammonium thiosulfate and the phosphate compound to a urea-ammonium nitrate solution wherein the nitrogen content has been adjusted to account for the nitrogen that will be supplied by the slurry.

22 Claims, No Drawings

NITROGEN FERTILIZER

BACKGROUND OF THE INVENTION

This invention relates to a nitrogen fertilizer which delivers increased nitrogen uptake to plants after application. More particularly, this invention relates to a nitrogen fertilizer which experiences decreased exposure to losses of nitrogen.

Nitrogen is a necessary element in the growth and development of plant life. Some plants such as legumes can take up atmospheric nitrogen and fix nitrogen into the soil. However, most plants, and in particular many plants used to produce human and animal food, require the use of nitrogen fertilizer to supply the necessary nitrogen to the plant. Nitrogen fertilizers have been, and continue to be, applied to farm fields during the various development stages of the plants. This is the case since the plant requirement for nitrogen changes during the growth and maturation of the plant. However, even with the careful application of nitrogen fertilizers, it is estimated that only about 40% to 70 percent of the nitrogen applied as fertilizer is taken up by the crop in a given year. The remaining nitrogen content of the fertilizers to which the plants are exposed is essentially lost. This then presents the challenge of how to improve the efficiency of the nitrogen fertilizers that are applied to a crop. The two ways to approach this challenge are to enhance the nitrogen feeding mechanism and to minimize the probability of nitrogen loss.

The nitrogen feeding mechanism can be enhanced by having the nitrogen present at the right place at the right time. That is the nitrogen should be in a form in the vicinity of the root system when there is a demand for nitrogen by the growing plant. In the past this has been accomplished by various scheduled applications of fertilizer during the growing season of the plant. Slow release fertilizers have also been used. However, these techniques have not fully solved the problem.

As an example of the problem, a corn plant has about a 115 day growing period from seed to a mature plant. The need of the corn plant for nitrogen varies during this period of time. In the first 25-day period when the plant goes from the seed stage to a small plant, the nitrogen requirement is about 19 pounds per 180 bushels of corn. During the next twenty-five day period as the plant grows and adds leaf material, the nitrogen demand is for about 84 pounds of nitrogen. During the third 25-period, while the plant is still growing and approaching a stage of maturity where tassel formation and kernel is initiated, the nitrogen requirement is for about 75 pounds of nitrogen. During fourth 25-day period when there is continued kernel development and kernel growth there is a requirement for about 48 pounds of nitrogen. At the point of full maturity and essentially complete cob formation and kernel growth the requirement for nitrogen during the next 15-day period is for about 14 pounds of nitrogen. Consequently, it can be seen as the corn plant grows and develops its need for nitrogen is constantly changing. However, as a rule the highest demand for nitrogen by a corn plant will be at the time of tassel formation and kernel development and growth.

The nitrogen in nitrogen fertilizers is lost after an application in various ways. When the nitrogen is applied as urea nitrogen, there is exposure to volatilization loss of nitrogen as ammonia. There is also the possibility of denitrification loss of nitrogen. In this loss, nitrate which has been applied in that form or which has been converted by soil organisms from the ammonium ion to the nitrate ion is lost through soil bacteria taking the oxygen from the nitrate leaving gaseous nitrogen which then escapes into the atmosphere. The other loss of nitrate is through a leaching of the nitrate downwardly to below the root level of the plant. This nitrate is lost into the lower levels of the soil table or into ground water. When this nitrate enters the groundwater it is considered to be a pollutant. Consequently it is now a further objective in the use of fertilizers to have a minimum amount of the fertilizer to leach downwardly in the soil to the groundwater.

Plants use nitrogen in the form of ammonium nitrogen and nitrate nitrogen to form amino acids which are then polymerized into proteins. The ammonium nitrogen can be taken up directly by the root system of the plant from the soil. However, nitrate nitrogen is more readily available to the root system of the plant and is more readily taken up than ammonium nitrogen in the early stages of plant growth. When nitrate nitrogen is taken up by the plant it is converted in the plant to ammonium nitrogen, then to amino acids, and then to proteins. One reason that the nitrate ion is more readily available to the plant and is more rapidly taken up by the plant is that it has a minus charge as does the clay and humus particles in the soil. Consequently, the nitrate ion is not bound into the soil. However, since the ammonium ion has a positive charge it is attracted to the clay and humus particles and is held by these particles until bacteria can cause the conversion of the ammonium ion to nitrate ion. As the ammonium ion is converted to nitrate ion it becomes available to the plant root system and is taken up by the plant. The plant root system can also take up nitrogen in the ammonium nitrogen form. Some research shows that plants prefer the ammonium form during the critical mid-season grain-fill period. It is during the periods of highest nitrogen demand by a plant that the plant needs to have sufficient nitrate nitrogen and sufficient ammonium nitrogen available in the area of the root system. Although nitrate nitrogen is rapidly taken up by the root system, it is considered that for maximizing the growth of a plant, and the yield from the plant that a balance of ammonium nitrogen and nitrate nitrogen is needed during periods of rapid plant growth.

The present improved nitrogen fertilizers solve many of these problems. These new and improved fertilizers minimize exposure to the loss of nitrogen through volatilization as ammonia. Further there is less nitrogen prone to denitrification loss and less leeching loss of the nitrogen in the form of nitrate. This is accomplished by having a large amount of the nitrogen available as ammonium nitrogen during the early stages of application. It is during these early stages of application that the plant does not have a high requirement for nitrogen. Since the nitrogen will be present as ammonium nitrogen, it will be held by the clay and humus in the soil until it can be converted to nitrate nitrogen. It is then gradually converted to nitrate nitrogen over a period of several weeks. Since nitrate nitrogen experiences the greater degree of loss, and since there is a decreased amount of nitrate nitrogen available, there is consequently a decreased loss of the nitrogen in the fertilizer through denitrification or through leeching. The result is an up to about 25 percent greater nitrogen efficiency. That is, there is an average of about a twenty-five percent increased utilization of the nitrogen that is applied to a field. In addition, there is also the factor that there is greater application flexibility. Since the nitrogen will remain in the soil and be available to the plant for a longer period of time, the fertilizer does not have to be applied to the plant in accordance with a rigorous schedule. In fact, in many instances the fertilizer can be applied once during the growing season and it will be available to the plant throughout the growing season. In addition this improved fertilizer is compatible with various herbicides which can be applied to the area in conjunction with the fertilizer.

BRIEF SUMMARY OF THE INVENTION

This new and improved nitrogen fertilizer is an aqueous fertilizer composition. The total nitrogen content of the fertilizer compositions will for convenience sake be either about 28 percent nitrogen or 32 percent nitrogen. The aqueous fertilizer composition is comprised of ammonium nitrate, urea, dicyandiamide, ammonium thiosulfate and a phosphate. The phosphate compound is preferably an ammonium phosphate compound and most preferably an ammonium polyphosphate compound. The components of the fertilizer composition will be present in the amounts of about 34 to 42 percent by weight ammonium nitrate, about 24 to 32 percent by weight of urea, about 1.0 to 2.0 weight percent of dicyandiamide, and about 1.0 to 3.0 percent by weight of ammonium thiosulfate sulfate. The phosphate compound will be present in an amount of about 0.5 to 1.0 percent by weight. The remainder of the composition will consist primarily of water. However, a herbicide, a dye, micronutrients or other materials can be incorporated into and be a part of the fertilizer solution.

This fertilizer solution is preferably formulated by the addition of a slurry of dicyandiamide, ammonium thiosulfate and the phosphate compound to a urea-ammonium nitrate solution. The slurry will contain from about 25 to 35 percent by weight dicyandiamide, from about 45 to 60 percent by weight of ammonium thiosulfate and from about 15 to 20 percent by weight of phosphate compound. In forming the fertilizer composition sufficient slurry is added in order to provide a final dicyandiamide, ammonium thiosulfate and phosphate compound concentration as hereinabove set forth. The urea nitrogen and the ammonium nitrate nitrogen are adjusted to provide a 28 percent nitrogen fertilizer solution or 32 percent nitrogen fertilizer solution depending on the amount of nitrogen that is added as dicyandiamide, ammonium thiosulfate and possibly with the phosphate compound. This fertilizer is applied in the same manner as any other urea-ammonium nitrate solution fertilizers.

DETAILED DESCRIPTION OF THE INVENTION

This present invention is directed to improved urea-ammonium nitrate solution fertilizers. These fertilizers can be applied to a crop such as corn at the time of the planting of the corn and be available in the soil throughout the growth cycle of the corn plant. There is also up to about a 25 percent greater nitrogen efficiency and a significantly decreased exposure to loss of the nitrogen in the fertilizer from the time of application until the time of uptake by the plant. There is a resulting savings in the amount of fertilizer that has to be applied, a savings in the cost of applying the fertilizer, and a savings in the time required for multiple applications of the fertilizer to a field.

The new and improved fertilizer compositions are aqueous urea-ammonium nitrate solutions. For convenience sake the fertilizer compositions will have either a 28 percent nitrogen content or a 32 percent nitrogen content. However, it is to be understood that the aqueous fertilizer compositions can have other nitrogen content levels. In this application for patent since urea-ammonium nitrate fertilizer solutions have essentially been standardized at 28 percent nitrogen and 32 percent nitrogen the present new and improved aqueous fertilizer composition will be described as having a 28 percent nitrogen content or a 32 percent nitrogen content.

The present urea-ammonium nitrate solution will contain in addition to urea and ammonium nitrate a quantity of dicyandiamide, ammonium thiosulfate and a phosphate compound. The phosphate compound is preferably an ammonium phosphate and most preferably ammonium polyphosphate. The component dicyandiamide has the following chemical formula:

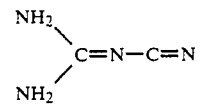

The aqueous fertilizer composition will contain from about 34 to 42 percent by weight of ammonium nitrate, from about 24 to 32 percent by weight of urea, from about 1.0 to 2.0 percent by weight of dicyandiamide and from about 1.0 to 3.0 percent by weight of ammonium thiosulfate. The phosphate compound will be present in an amount of about 0.5 to 1.0 percent by weight of the fertilizer composition. The remainder of the composition will consist primarily of water.

The dicyandiamide component of the fertilizer composition will be present in the fertilizer composition as being dissolved in the water and as suspended in the water. Dicyandiamide is soluble in water in an amount 3.1 percent by weight. The remaining components will be dissolved in the water.

In a preferred composition the fertilizer will contain about 38 percent by weight of ammonium nitrate, about 28 percent by weight of urea, about 1.4 percent by weight of dicyandiamide, about 2.1 percent by weight of ammonium thiosulfate and about 0.75 percent by weight of ammonium polyphosphate.

The dicyandiamide functions in the fertilizer as a slow release source of nitrogen. When maintained in the ammonium nitrogen form the nitrogen remains bound to the humus and clay in the soil and will not be susceptible to loss. Consequently the dicyandiamide is available to the plant as a source of nitrogen for a longer period of time. When urea is converted to ammonium nitrogen some ammonia gas can be lost into the atmosphere. The ammonium thiosulfate component functions as a source of both nitrogen and sulfur and further functions to reduce the possibility of ammonia loss when urea converts to the ammonium form of nitrogen. The phosphate component of the fertilizer solution functions primarily as a holding agent in the soil for the dicyandiamide. The phosphate ion retards the breakdown in the soil of the dicyandiamide and thus extends the life of the dicyandiamide in the soil. The phosphate compound will also function to assist in reducing the free ammonia content in the fertilizer suspension.

This new fertilizer is conveniently produced by adding a slurry concentrate of the dicyandiamide component, the ammonium thiosulfate component and the phosphate compound component to the urea-ammonium nitrate solution. This is the case since urea-ammonium nitrate solutions are well-known and are produced in large quantities. In the formation of the new and improved fertilizer compositions a 28 percent urea-ammonium nitrate or a 32 percent urea-ammonium nitrate solution is diluted with water so that after the addition of the slurry concentrate the final nitrogen content of the fertilizer will still be either 28 percent nitrogen or 32 percent nitrogen. The slurry concentrate is blended into the urea-ammonium nitrate solution to give the desired 28 percent nitrogen solution or 32 percent nitrogen solution and then can be applied to a field. As previously noted above the dicyandiamide component will at least partially be present in the fertilizer solution as a suspended solid. The new and improved fertilizer solution is applied to a farm field in the same manner that other urea-ammonium nitrate solutions are applied to fields.

This improved fertilizer composition will now be set forth in more detail with reference to the following:

EXAMPLE 1

The example describes the method of making the dicyandiamide, ammonium thiosulfate, ammonium polyphosphate slurry concentrate composition.

A mixing vessel is used which has a high shear and a strong agitation affect on the substances being mixed. A typical batch of concentrate will consist of 44 tons of concentrate. The mixer will consist of two paddles and a pump arrangement to circulate the bottoms up and onto the top of the mixture. 1536.48 pounds of water are added to the mixing vessel and the paddle mixers and pump started. 43,227.8 pounds of ammonium thiosulfate are then added followed by the addition of 16,210 pounds of ammonium polyphosphate. These three components are liquids and form a blend. 27,017.3 pounds of solid dicyandiamide is then added to the mixing vessel over a period of 20 to 25 minutes with continued agitation. Upon the dicyandiamide being fully mixed to form a viscous slurry, 8.8 grams of a blue dye are added. The dye is added for commercial purposes to distinguish the concentrate and the final fertilizer product.

After mixing the slurry concentrate is pumped into a holding tank. From the holding tank the slurry concentrate is pumped to on site use to make liquid fertilizer compositions or pumped to tanker trucks for distribution to liquid fertilizer manufacturing plants.

EXAMPLE 2

The example describes the forming of a 28 percent nitrogen fertilizer composition using the slurry concentrate of Example 1.

82.4 pounds of the slurry concentrate of Example 1 is mixed with 1917.6 pounds of an aqueous 28 percent nitrogen urea ammonium nitrate solution. This solution contains 590 pounds of urea and 750 pounds of ammonium nitrate. The fluid solution after the addition of the slurry concentrate is adjusted with water to yield a final solution containing 28 percent nitrogen.

EXAMPLE 3

This example sets forth a comparison of the fertilizer solution of Example 2 at 28 percent nitrogen with a standard urea-ammonium nitrate solution fertilizer also at 28 percent nitrogen.

A conventional 28 percent nitrogen urea ammonium nitrate solution fertilizer has a analysis of about 29.30 to 32.20 percent by weight urea, 37.10 to 41.00 percent by weight ammonium nitrate, a free ammonia content of about 500 ppm, a pH of 6.5 to 7.4 and a ratio of ammonium nitrate to urea of 1.15 to 1.40. The remainder of the composition is water. It may also contain a corrosion inhibitor to prevent the corrosion of storage and application equipment.

Side by side plots (Plot A and Plot B) were planted with Pioneer 3904 corn seed on the same date. Forty-five days after planting 165 pounds per acre of nitrogen were applied to each plot using a knifed-in side dressing technique. In Plot A the fertilizer composition of Example 2 was applied. In Plot B, a conventional 28 percent nitrogen urea-ammonium nitrate fertilizer solution as set forth above was applied. The plant population at harvest was 24,000 plants per acre for each field. All other applications of fertilizer and herbicide and pesticides were the same for each plot. The harvest date of each field was November 12. Plot A had a yield of 152.6 bushels per acre while Plot B had a yield of 141.2 bushels per acre. Plot A had an increased yield of 11.4 bushels per acre greater than Plot B.

EXAMPLE 4

This example sets forth a comparison of the fertilizer of Example 2 and a conventional 28 percent nitrogen urea-ammonium nitrate solution fertilizer where each is applied by broadcasting.

The seed corn was O$^s$ Gold 6880 and it was planted in Plot C and in Plot D on May 1. Four days later 150 pounds per acre of nitrogen solution fertilizer of Example 2 was applied to Plot C and 150 pounds per acre of a conventional urea-ammonium nitrate solution fertilizer was applied to Plot D. All the other applications of fertilizers, herbicides and pesticides were the same for each plot. The corn was harvested on each plot on November 9. The yield from Plot C was 124.52 bushels per acre and the yield from Plot D was 115.60 bushels per acre. Plot C yielded 8.92 more bushels per acre of corn than Plot D.

EXAMPLE 5

This example sets forth a comparison of the fertilizer solution of Example 2 applied at a rate of 150 pounds per acre versus 190 pounds per acre of a conventional 28 percent nitrogen urea-ammonium nitrate solution.

DeKalb 636 corn seed was planted in Plots E, F and G. The planting date was April 10. The plant population per acre was 26,000. After planting each plot was treated with fertilizer. Plot E was treated with a broadcast application of the fertilizer of Example 2 at a rate of 150 pounds nitrogen per acre. Plot F was treated with a broadcast application of a conventional 28 percent nitrogen urea-ammonium nitrate solution fertilizer at the rate of 190 pounds of nitrogen per acre. Plot G was treated with a strip application of a conventional 28 percent nitrogen urea-ammonium nitrate solution at the rate of 190 pounds of nitrogen per acre. After each fertilizer application each field was tilled. All other fertilizer, herbicide and pesticide treatments for each field were the same. Plot E had a yield of 183.44 bushels per acre, Plot F a yield of 186.36 bushels per acre and Plot G a yield of 178.56 bushes per acre.

This example shows that the application of 150 pounds per acre of nitrogen using the fertilizer of Example 2 provided an increased yield of 4.88 bushels per acre over the use of 190 pounds per acre of nitrogen from a conventional urea-ammonium nitrate solution fertilizer in Plot G and a decrease of only 2.02 bushels per acre in yield with regard to Plot F. In a comparison of Plots E and F, a 26.67 percent increase in nitrogen application in Plot F produced only a 1.6 percent increase in yield for Plot F over Plot E. The Plot E fertilizer is shown to be more effective in plant uptake.

EXAMPLE 6

This example compares the preplanting incorporation of the fertilizer of Example 2 and of a conventional 28 percent nitrogen urea-ammonium nitrate solution.

Plot H was treated with the fertilizer of Example 2 and Plot J was treated with the conventional 28 percent nitrogen urea-ammonium nitrate solution fertilizer. The fertilizer was applied to each plot at the rate of 165 pounds of nitrogen per acre by broadcasting. The plots were then tilled and planted with corn. The yield for Plot H was 171.81 bushels per acre while the yield for Plot J was 156.74 bushels per acre. Plot H had an increased yield over Plot J of 15.07 bushels per acre.

What is claimed is:

1. A method of enhancing the growth of plants by applying to the area where the plants are to be grown an aqueous fertilizer solution comprising ammonium nitrate, urea, dicyandiamide, ammonium thiosulfate and an ammonium phosphate compound, wherein the dicyandiamide is included in the amount of about 1% to about 2% by weight based on the total weight of the solution.

2. A method as in claim 1 wherein said aqueous fertilizer solution contains about 28 percent by weight of nitrogen.

3. A method as in claim 2 wherein said ammonium nitrate is present in an amount of about 34 to 42 percent by weight; said urea is present in an amount of about 24 to 32 percent by weight; and said ammonium thiosulfate is present in an amount of about 1.0 to 3.0 percent by weight based on the total weight of the aqueous solution.

4. A method as in claim 3 wherein said ammonium phosphate compound is ammonium polyphosphate and is present in an amount of about 0.6 to 0.9 percent by weight based on the total weight of the solution.

5. A method as in claim 1 wherein said aqueous fertilizer solution contains about 32 percent by weight of nitrogen.

6. A method as in claim 5 wherein said ammonium nitrate is present in an amount of about 34 to 42 percent by weight; said urea is present in an amount of about 24 to 32 percent by weight; and said ammonium thiosulfate is present in an amount of about 1.0 to 3.0 percent by weight based on the total weight of the solution.

7. A method as in claim 6 wherein said ammonium phosphate compound is ammonium polyphosphate and is present in an amount of about 0.6 to 0.9 percent by weight based on the total weight of the solution.

8. A method as in claim 1 wherein said ammonium phosphate compound is ammonium polyphosphate and is present in an amount of about 0.5 to 1.0 percent by weight based on the total weight of the solution.

9. A method as in claim 1 wherein said solution contains ammonium nitrate in an amount of about 38 percent by weight; urea in an amount of about 28 percent by weight; dicyandiamide in an amount of about 1.4 percent by weight, ammonium thiosulfate in an amount of about 2.1 percent by weight and ammonium phosphate compound in an amount of about 0.75 percent by weight wherein the percentages are based on the total weight of the solution.

10. A method of enhancing growth according to claim 1 wherein the fertilizer solution contains about 1.0% to about 3.0% by weight ammonium thiosulfate based on the total weight of the solution.

11. A method of making an aqueous fertilizer solution containing ammonium nitrate, urea, dicyandiamide, ammonium thiosulfate and an ammonium phosphate compound comprising forming an aqueous slurry of the dicyandiamide, ammonium thiosulfate and ammonium phosphate compound and adding this slurry to an aqueous solution of ammonium nitrate and urea, wherein the slurry includes dicyandiamide in an amount to produce a fertilizer solution containing about 1.0% to about 2.0% by weight dicyandiamide based on the total weight of the solution.

12. A method of making an aqueous fertilizer solution as in claim 11 wherein said aqueous fertilizer solution contains about 28 percent by weight nitrogen.

13. A method of making an aqueous fertilizer solution as in claim 11 wherein said aqueous fertilizer solution contains about 32 percent by weight nitrogen.

14. A method of making an aqueous fertilizer solution as in claim 11 wherein said aqueous slurry contains from about 25 to 35 percent by weight dicyandiamide, from about 45 to 60 percent by weight ammonium thiosulfate and from about 15 to 20 percent by weight of said ammonium phosphate compound based on the total weight of the slurry.

15. A method of making an aqueous fertilizer solution in accordance with claim 11 wherein the ammonium thiosulfate is included in an amount to product a fertilizer composition containing about 1.0% to about 3.0% based on the total weight of the solution.

16. A method of inhibiting nitrification in soil of an aqueous fertilizer solution containing ammonium nitrate, urea and ammonium phosphate wherein said method comprises adding about 1.0% to 2.0% dicyandiamide and about 1.0% to 3.0% ammonium thiosulfate to said aqueous fertilizer solution containing ammonium nitrate, urea and ammonium phosphate, wherein the percentages are by weight based on the total weight of the aqueous fertilizer solution.

17. The method of claim 16 wherein the dicyandiamide is added in the amount of about 1.4% by weight and the ammonium thiosulfate is added in the amount of about 2.1% by weight based on the total weight of the aqueous fertilizer solution.

18. The method of claim 16 wherein the aqueous fertilizer solution includes about 34 to 42 percent by weight of ammonium nitrate; about 24 to 32 percent by weight urea; and about 0.6 to 0.9 percent by weight of ammonium polyphosphate.

19. The method of claim 16 wherein the aqueous fertilizer solution includes about 38 percent by weight of ammonium nitrate; about 1.4 percent dicyandiamide, about 28 percent by weight urea; and about 0.75 percent by weight of ammonium polyphosphate.

20. A method of enhancing the growth of plants by applying to the area where the plants are to be grown an aqueous fertilizer solution comprising about 34 to 42 percent by weight of ammonium nitrate; about 24 to 32 percent by weight urea; about 1.0 to 2.0 percent by weight of dicyandiamide; 1.0 to 3.0 percent by weight of ammonium thiosulfate and about 0.6 to 0.9 percent by weight of ammonium polyphosphate.

21. A method as in claim 20 wherein said aqueous fertilizer solution is applied after planting the seed.

22. A method as in claim 20 wherein said seeds are selected from the group consisting of corn and wheat seeds.

* * * * *

UNITED STATES PATENT AND TRADEMARK OFFICE
CERTIFICATE OF CORRECTION

PATENT NO. : 5,024,689
DATED : June 18, 1991
INVENTOR(S) : Sutton et al.

It is certified that error appears in the above-identified patent and that said Letters Patent is hereby corrected as shown below:

On the Title page

In the Abstract, line 3, "nitrogen with" should read --nitrogen fertilizer with--.

Column 1, line 33, "in a form" should read --in an available form--.

Column 1, line 52, "During fourth" should read --During the fourth--.

Column 2, line 52, "leeching" should read --leaching--.

Column 2, line 66, "leeching" should read --leaching--.

Column 4, line 25,
$$\begin{matrix}NH_2\\ \phantom{N}\searrow\\ \phantom{NNN}C=N-C=N\\ \phantom{N}\nearrow\\ NH_2\end{matrix}$$

should read
$$\begin{matrix}NH_2\\ \phantom{N}\searrow\\ \phantom{NNN}C=N-C\equiv N\\ \phantom{N}\nearrow\\ NH_2\end{matrix}$$

Signed and Sealed this

Twenty-ninth Day of December, 1992

Attest:

DOUGLAS B. COMER

Attesting Officer     Acting Commissioner of Patents and Trademarks